United States Patent
Sanchez et al.

(10) Patent No.: US 8,168,123 B2
(45) Date of Patent: May 1, 2012

(54) FLUIDIZED BED REACTOR FOR PRODUCTION OF HIGH PURITY SILICON

(75) Inventors: Javier San Segundo Sanchez, Alboraya (ES); Jose Luis Montesinos Barona, Lliria (ES); Evaristo Ayuso Conejero, Valencia (ES); Manuel Vicente Vales Canle, Valencia (ES); Xavier Benavides Rel, Meliana (ES); Pedro-Tomas Lujan Garcia, Paterna (ES); Maria Tomas Martinez, Murcia (ES)

(73) Assignee: Siliken Chemicals, S.L., Casas Ibanez (ES)

( * ) Notice: Subject to any disclaimer, the term of this patent is extended or adjusted under 35 U.S.C. 154(b) by 126 days.

(21) Appl. No.: 12/393,852

(22) Filed: Feb. 26, 2009

(65) Prior Publication Data

US 2010/0215562 A1    Aug. 26, 2010

(51) Int. Cl.
- *B01J 8/24* (2006.01)
- *B01J 19/02* (2006.01)
- *C01B 33/021* (2006.01)

(52) U.S. Cl. ........ 422/139; 422/145; 422/240; 422/241; 423/348

(58) Field of Classification Search .................. 422/139, 422/240, 241, 145; 423/348
See application file for complete search history.

(56) References Cited

U.S. PATENT DOCUMENTS

| | | | |
|---|---|---|---|
| 3,719,519 A | * | 3/1973 | Perugini .................. 428/557 |
| 3,906,605 A | * | 9/1975 | McLain ................... 29/890.045 |
| 4,084,024 A | | 4/1978 | Schumacher |
| 4,134,514 A | | 1/1979 | Schumacher |
| 4,140,735 A | | 2/1979 | Schumacher |
| 4,227,291 A | | 10/1980 | Schumacher |
| 4,298,037 A | | 11/1981 | Schumacher et al. |
| 4,318,942 A | | 3/1982 | Woerner et al. |
| 4,341,610 A | | 7/1982 | Schumacher |
| 4,393,013 A | | 7/1983 | McMenamin |
| 4,436,674 A | | 3/1984 | McMenamin |
| 4,818,495 A | | 4/1989 | Iya |
| 4,820,587 A | | 4/1989 | Gautreaux et al. |
| 4,859,375 A | | 8/1989 | Lipisko et al. |
| 4,883,687 A | | 11/1989 | Gautreaux et al. |
| 4,891,201 A | | 1/1990 | Schumacher |
| 4,900,411 A | | 2/1990 | Poong et al. |
| 4,956,169 A | * | 9/1990 | Ajioka et al. ................. 423/502 |
| 4,979,643 A | | 12/1990 | Lipisko et al. |
| 5,026,533 A | | 6/1991 | Matthes et al. |
| 5,077,028 A | | 12/1991 | Age |

(Continued)

FOREIGN PATENT DOCUMENTS

EP    1023932    8/2000

(Continued)

OTHER PUBLICATIONS

Special Metals Incoloy(R) Alloy 825. Retrieved from http://www.matweb.com on Dec. 13, 2010.*

(Continued)

*Primary Examiner* — Jennifer A Leung
(74) *Attorney, Agent, or Firm* — Stoel Rives LLP

(57) ABSTRACT

Methods and apparatus for the production of high purity silicon including a fluidized bed reactor with one or more protective layers deposited on an inside surface of the fluidized bed reactor. The protective layer may be resistant to corrosion by fluidizing gases and silicon-bearing gases.

16 Claims, 3 Drawing Sheets

U.S. PATENT DOCUMENTS

| | | | |
|---|---|---|---|
| 5,139,762 A | 8/1992 | Flagella | |
| 5,242,671 A | 9/1993 | Allen et al. | |
| 5,284,676 A | 2/1994 | Accuntius et al. | |
| 5,326,547 A | 7/1994 | Allen | |
| 5,374,413 A | 12/1994 | Kim et al. | |
| 5,445,742 A | 8/1995 | Almquist et al. | |
| 5,516,345 A | 5/1996 | Brown | |
| 5,776,416 A | 7/1998 | Oda | |
| 5,798,137 A | 8/1998 | Lord et al. | |
| 5,810,934 A | 9/1998 | Lord et al. | |
| 5,910,290 A | 6/1999 | Hyppanen | |
| 5,910,295 A | 6/1999 | DeLuca | |
| 5,976,247 A | 11/1999 | Hansen et al. | |
| 6,007,869 A | 12/1999 | Schreieder et al. | |
| 6,060,021 A | 5/2000 | Oda | |
| 6,465,674 B1 | 10/2002 | Kalchauer et al. | |
| 6,541,377 B2 | 4/2003 | Kim et al. | |
| 6,846,473 B2 | 1/2005 | Kirii et al. | |
| 6,849,244 B2 | 2/2005 | Konig et al. | |
| 6,852,301 B2 | 2/2005 | Block et al. | |
| 6,932,954 B2 | 8/2005 | Wakamatsu et al. | |
| 6,953,559 B2 | 10/2005 | Mleczko | |
| 7,001,579 B2 | 2/2006 | Metzger | |
| 7,029,632 B1* | 4/2006 | Weidhaus et al. | 422/139 |
| 7,033,561 B2 | 4/2006 | Kendig et al. | |
| 7,056,484 B2 | 6/2006 | Bulan et al. | |
| 7,105,053 B2 | 9/2006 | Winterton et al. | |
| 7,141,114 B2 | 11/2006 | Spangler et al. | |
| 7,462,211 B2 | 12/2008 | Beech, Jr. et al. | |
| 7,462,341 B2 | 12/2008 | Hoel et al. | |
| 7,490,785 B2 | 2/2009 | Weidhaus | |
| 7,553,466 B2 | 6/2009 | Herold | |
| 2002/0187096 A1 | 12/2002 | Kendig et al. | |
| 2004/0042950 A1 | 3/2004 | Mleczko et al. | |
| 2004/0151652 A1 | 8/2004 | Herold et al. | |
| 2005/0161158 A1 | 7/2005 | Schumacher | |
| 2006/0105105 A1 | 5/2006 | Ibrahim et al. | |
| 2007/0217988 A1* | 9/2007 | Amendola | 423/324 |
| 2007/0248521 A1 | 10/2007 | Kutsovsky et al. | |
| 2008/0020216 A1* | 1/2008 | Bagnoli et al. | 428/469 |
| 2008/0056979 A1 | 3/2008 | Arvidson et al. | |
| 2008/0220166 A1 | 9/2008 | Ege et al. | |
| 2008/0241046 A1 | 10/2008 | Hertlein et al. | |
| 2008/0299291 A1 | 12/2008 | Weidhaus | |
| 2010/0112744 A1 | 5/2010 | Molnar | |
| 2010/0215562 A1 | 8/2010 | Sanchez et al. | |
| 2011/0027160 A1 | 2/2011 | Sanchez et al. | |

FOREIGN PATENT DOCUMENTS

| | | | |
|---|---|---|---|
| EP | 1437327 | | 7/2004 |
| JP | 63117906 A | * | 5/1988 |
| JP | 06127922 A | * | 5/1994 |
| WO | WO2005/085133 | | 9/2005 |
| WO | WO2007/012027 | | 1/2007 |
| WO | WO2007/035108 | | 3/2007 |

OTHER PUBLICATIONS

Hastelloy(R) C-2000(R) alloy. Haynes International, Inc. 2005.*
International Search Report for PCT/US2009/065345.
'Proceedings of the Flat-Plate Solar Array Project Workshop on Low-Cost Polysilicon for Terrestrial Photovoltaic Solar-Cell Applications'. Oct. 28-30, 1985 at Las Vegas, NV, Feb. 1986. Prepared for U.S. Department of Energy, through National Aeronautics by Jet Propulsion Laboratory, Pub. 86-11.
'Silicon Production in a Fluidized Bed Reactor: Final Report'. Apr. 1986. Prepared for U.S. Department of Energy, through National Aeronautics by Jet Propulsion Laboratory, Pub. 86-17.
'The Kinetics of Epitaxial Silicon Deposition by the Hydrogen Reduction of Chlorosilanes'. B.E. Bradshaw—Int. J. Electronics, vol. 21, No. 3, pp. 205-227, 1966.
'A Through Thermodynamic Evaluation of the Silicon-Hydrogen-Chlorine System'. L.P. Hunt, E. Sirtl—J. Electrochem. Soc., vol. 119, No. 12, pp. 1741-1745, Dec. 1972.
'High Temperature Reactions in the Silicon-Hydrogen-Chlorine System.' E. Sirtl, L.P. Hunt, D.H Sawyer—J. Electrochem. Soc., vol. 121, No. 7, pp. 919-925, Jul. 1974.
LSA Silicon Material Task Closed—Cycle Process Development—Interim Summary Report August—JPL Contract No. 955006, Dec. 1978.
'Gas Phase Diffusion and Surface Reactions in the Chemical Vapour Deposition of Silicon'. J. Bloem—Pure & Appl. Chem, vol. 50, pp. 435-447, 1978.
'Mass Spectrometric Studies on High Temperature Reaction Between Hydrogen Chloride & Silica/Silicon'. S.S. Lin—Technical Note: Army Materials and Mechanics Research Center, Watertown MA 02072, J. Electrochem. Soc. Electrochemical Science and Tech. vol. 123 No. 4, p. 512-514, Apr. 1976.
'Nanoporous Carbide-Derived Carbon with Tunable Pore Size'. Gogotsi, Yury et al., Nature Materials, vol. 2, pp. 591-594, Sep. 2003.
'Carbide Coatings Produced by High Temperature Chlorination of silicon Carbide Geramics'. Ersoy, Daniel et al., Mat. Res. Innovat., 5: 55-62, 2001.
'Frictional Behavior of Carbide Derived Carbon Films Synthesized on Tungsten Carbide in Moderately Humid Air and Dry Nitrogen'. Tlustochowicz, M., CLT Group Presentation, Jun. 22, 2001.
'Tribology of Carbide Derived Carbon Films Synthesized on Tungsten Carbide'. Tlustochowicz, M., Energy Systems Division, Argonne National Laboratory, 2009.
'Processes & Process Developments in Japan'. Toshio Noda, Osaka Titanium co. Ltd., p. 213-231, Feb. 1986.
'Silicon Production in a Fluidized Bed Reactor: Final Report'. Rohatgi, N.K., Solar Array Project, Flat-Plate, Department of Energy, JPL Publication 86-17, Apr. 1986.
'The Chlorination Kinetics of Tungsten, Molybdenum, and their Alloys'. Landsberg, A. et al., J. Electrochem. Soc.: Solid State Science, vol. 118 No. 8, p. 1331-1336, Aug. 1971.
Gogotsi et al., 'Nano Porous Carbide-Derived Carbon with Tunable Pore Size'. Nature Materials, vol. 2, pp. 591-594, Sep. 2003.
Marra et al., 'Reactions of Silicon-Based Ceramics in Mixed Oxidation Chlorination Environments'. Journal of the American Ceramic Society, vol. 71 No. 12, pp. 1067-1073, Dec. 1988.
Ersoy et al., 'Carbon coatings Produced by High Temperature Chlorination of Silicon Carbide Ceramics'. Mat. Res. Innovat. 5: 55-62, 2001.
Landsberg et al., 'The Chlorination Kinetics of Tungsten Molybdenum and their Alloys'. J. Electrochem. Soc. Solid State Science, pp. 1331,1336, Aug. 1971.
Lin, 'Mass Spectrometric Studies on High Temperature Reaction Between Hydrogen Chloride and Silica/Silicon'. Mass Spectrometric Studies, vol. 123 No. 4, pp. 512-514, Apr. 1976.
'Oxygen, Carbon & Nitrogen in Silicon'. Handbook of Semiconductor Silicon Technology, pp. 526-533. Dec. 1990.
Office Action dated Aug. 10, 2011 for U.S. Appl. No. 12/903,994.
Special Metals Incoloy® Alloy 825. Retrieved from http://www.matweb.com on Dec. 13, 2010.
Hastelloy® C2000® alloy. Haynes International, Inc. 2005.
Office Action dated Jan. 18, 2012 for U.S. Appl. No. 12/903,994.
Notice of Allowance dated Feb. 15, 2012 for U.S. Appl. No. 12/903,994.

* cited by examiner

FLUIDIZED BED REACTOR FOR PRODUCTION OF HIGH PURITY SILICON

TECHNICAL FIELD

The present disclosure relates to methods for producing high purity electronic grade silicon. More particularly, this disclosure relates to methods for producing high purity silicon beads by chemical vapor deposition (CVD) of a silicon-bearing gas on seed particles by decomposition in a fluidized bed reactor.

DETAILED DESCRIPTION

Figure 1:
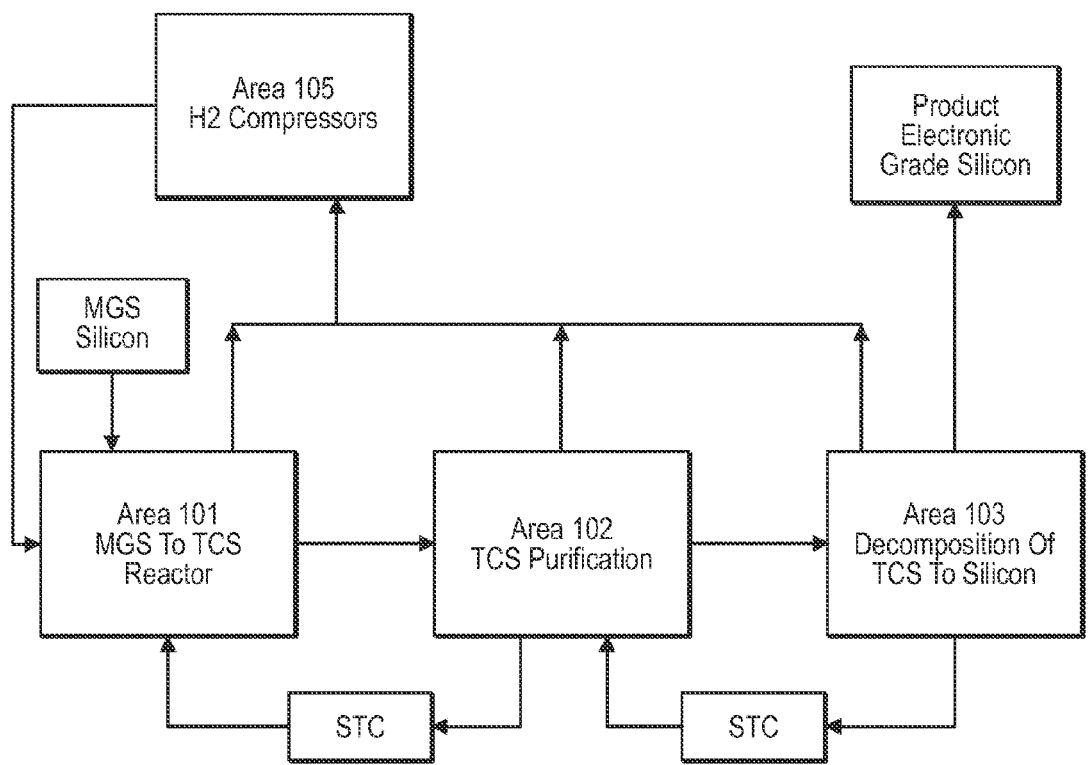
FIG. 1 shows one embodiment of a process for the purification of silicon.

Polycrystalline silicon may be used in the production of electronic components and solar panel construction. One conventional method of producing polycrystalline silicon is feeding a mixture comprising hydrogen and silane ($SiH_4$) or a mixture comprising hydrogen and a halosilane, such as trichlorosilane ($HSiCl_3$), is fed to a decomposition reactor containing a hot wire or hot substrate rods. This method requires a high amount of energy per unit of mass of produced silicon, and the silicon rods produced by this method need further processing to be used in a silicon ingot growing process.

An alternate silicon production method is to feed a mixture comprising hydrogen and silane or a mixture comprising hydrogen and trichlorosilane to a fluidized bed containing silicon beads that are maintained at high temperature. Decomposition of silane or trichlorosilane causes the deposition of elemental silicon on the surface of the beads. Therefore, the silicon beads grow in size, and when large enough, are passed out of the fluidized bed reactor as a high purity silicon product. In comparison to the substrate used in wire or rod substrate reactors, fluidized bed reactors allow for a much larger contact area between the beads and the silicon-bearing gases in a heated chamber, enhancing the thermal decomposition of the silicon-bearing gases thereby forming high purity elemental silicon on the surface of existing beads.

As described herein, the purity of the silicon produced using a fluidized bed reactor may be preserved by constructing the reactor out of materials that do not contaminate the silicon product. In one such embodiment, a fluidized bed reactor, or reactor, or reactor system used for the production of high purity silicon may be constructed out of a material that prevents or minimizes the contamination of the polycrystalline silicon product due to the diffusion of impurities from the materials used to construct the reactor. In another embodiment, the reactor may be constructed or lined or coated with a material that is inert or resistant to the reactor feed gases and fluidized gases and the other gases or products that may be produced during the use of a fluidized bed reactor.

In one embodiment, a fluidized bed reactor according to the disclosure herein may include an elongate chamber or column comprising one or more inlet openings and one or more outlet openings. In one such embodiment, a fluidized bed reactor may include a bed of granular solid materials, such as a bed of silicon beads that can be used as seed beads to seed a silicon decomposition reaction during which the seed beads can increase in size because of the deposition of additional silicon on the surface of the seed beads. The seed beads with the added silicon product may be eventually removed from the reactor to recover the high purity silicon product. The seed beads may be "fluidized", or suspended in the reactor, by injecting fluidizing gases into the reactor at sufficient velocities to agitate the beads. The fluidizing gases may be injected into the reactor through one or more inlet openings located around the reactor such as at the ends of the column and at the sides of the reactor column. In one embodiment, the fluidizing gases or the silicon product may be removed from the reactor through one or more outlet openings. In one such embodiment, the reactor may be constructed or lined or coated with a material that is inert or resistant to the fluidizing gases used to fluidize the bed of silicon beads.

A silicon-bearing gas may be injected into a fluidized bed reactor that may be constructed, lined or coated with a material that is inert or resistant to the silicon-bearing gas. In one embodiment, the silicon-bearing gas may be trichlorosilane (TCS) that can be injected into the reactor at the same location or a location adjacent to the fluidizing gas. When heated, TCS decomposes in the reactor to form silicon on the seed silicon beads thereby increasing the diameter of the seed silicon beads over time and producing the desired high purity silicon product. One reason that the resulting polycrystalline silicon product is of high purity is because the reactor has been constructed out of a material that prevents or minimizes the contamination of the silicon during decomposition. The resulting silicon product beads may then be recovered from the reactor and used for the production of semiconductors and photovoltaic cells.

Methods for the production of high purity silicon may include the use of a fluidized bed reactor configured to avoid reactor corrosion and prevent the contamination of a silicon product. In one embodiment, a method of silicon production may include the conversion of metallurgical grade silicon (MGS) into a hydrohalosilane such as trichlorosilane (TCS); the purification of the hydrohalosilane, such as by distillation; and the decomposition of the hydrohalosilane back to silicon.

In one embodiment, the conversion of MGS into hydrohalosilane may be accomplished by reacting silicon with silicon tetrachloride (STC), hydrogen and hydrogen chloride to form TCS and hydrogen. With reference to FIG. 1, the following reactions may occur inside area 101:

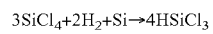

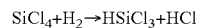

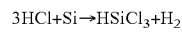

In one embodiment, the result of the reaction in area 101 may be a mix of gases including TCS, STC, and $H_2$ that can be removed from area 101 and then introduced in area 102 for purification by distillation.

The purification of TCS by distillation of the hydrohalosilanes may occur in area 102 as shown in FIG. 1. In one embodiment, the gas stream from area 101, including TCS, STC and other hydrohalosilanes, may be injected into a distillation column in area 102 resulting in high purity TCS. Hydrogen may be recycled for use in area 101 after further purity removal. The resulting TCS vapor is a silicon-bearing gas that may be injected into a fluidized bed reactor that may be used for a silicon decomposition process in area 103.

Area 103 may comprise multiple elements for the conversion of TCS into high purity silicon. For example, area 103 may comprise one or more of the following: fluidized bed reactor, storage tank, evaporator, reactor heater, gas separator, granular separator, cyclone, heat recovery system, product recovery system and other devices and systems for the production of high purity silicon. The term hydrohalosalines refers to any silane species having one or more halide atoms and one or more hydrogen atoms bonded to silicon and includes, but is not limited to monochlorosilane ($H_3SiCl$), dichlorosilane ($H_2SiCl_2$), trichlorosilane ($HSiCl_3$) and various chlorinated disilanes such as pentachlorodisilane.

Figure 2:
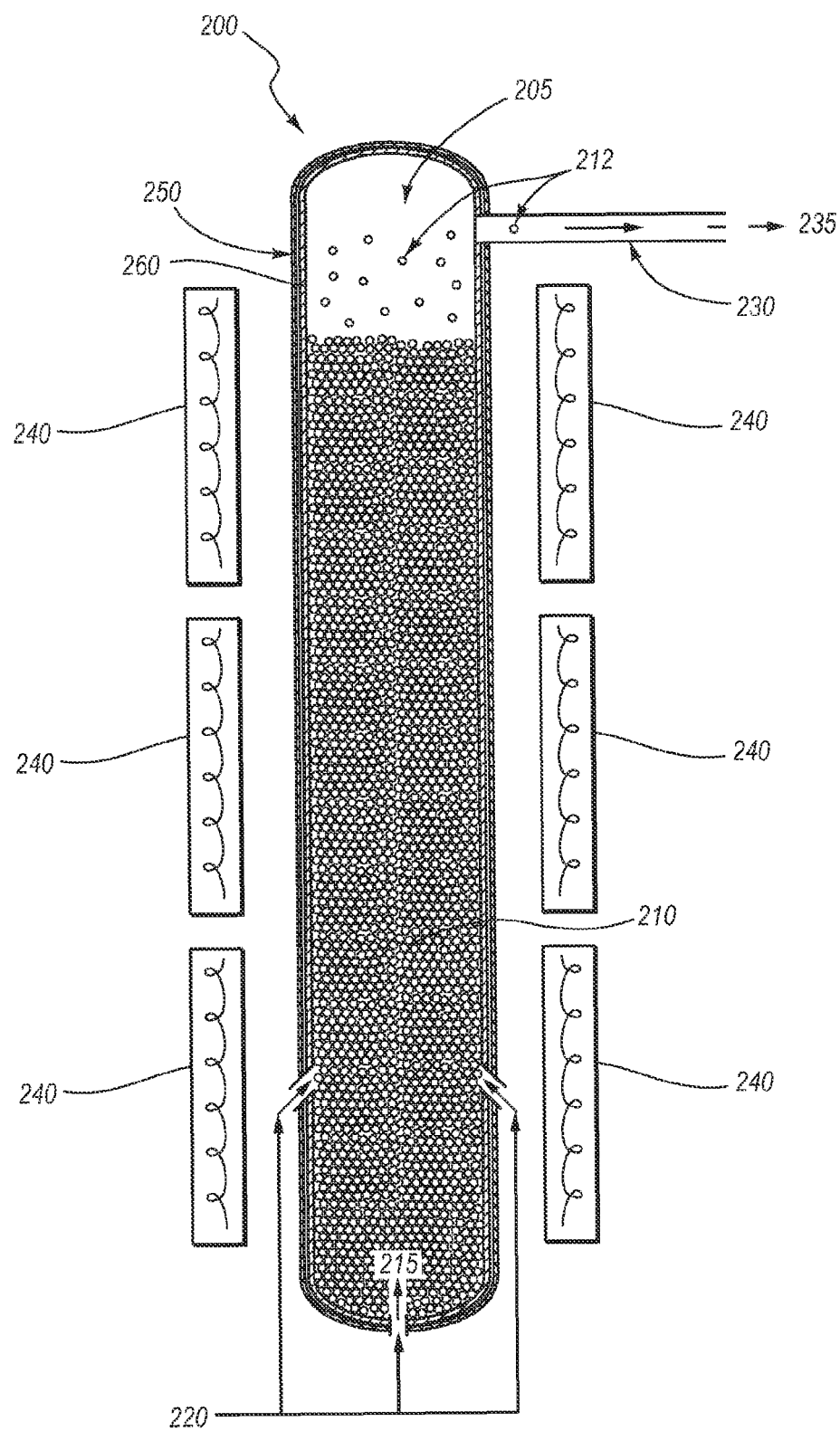
FIG. 2 shows one embodiment of a fluidized bed reactor used for the purification of silicon.

In one embodiment, a silicon-bearing gas, such as a TCS vapor, may be used for the production of high purity silicon. The conversion of TCS into high purity silicon may be accomplished using a fluidized bed reactor 200 as shown in FIG. 2, in which the following reaction may occur:

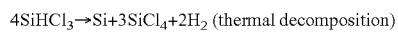
$4SiHCl_3 \rightarrow Si+3SiCl_4+2H_2$ (thermal decomposition)

The fluidized bed reactor 200 used in the decomposition process may include an elongate chamber or column 205 which includes a bed of silicon beads 210, which may be used to seed silicon a decomposition reaction. The beads 210 may be "fluidized" by initially injecting gases, such as fluidizing gases 215 from inlet 220 into the column 205 to agitate or fluidize the silicon beads 210. In one embodiment, the fluidizing gases 215 may include hydrogen and silicon tetrachloride $SiCl_4$. In another embodiment, the fluidizing gas may be one or a mixture selected from the group consisting of hydrogen, helium, argon, silicon tetrachloride, silicon tetrabromide and silicon tetraiodide. In one such embodiment, the fluidizing gases 215 may be injected into the column 205 from several areas of the reactor 200 such as at the bottom or sides of the column 205, such as through inlet 220.

The fluidized bed reactor 200 may be heated by one or more heaters 240 placed around or near the body of reactor 200. The heaters 240 may be radiant, conductive, electromagnetic, infrared or other type of heaters known by those of skill in the art. In one embodiment, the surface of the reactor wall 250 may be textured, etched or sand-blasted in order to increase the thermal emissivity or the thermal power transfer efficiency of the reactor wall 250 and improve heating by the heater 240 of the column 205 and the inside of the reactor 200.

In another embodiment, a heating device, such as heater 240, may be in total or partial contact with the reactor wall 250. In yet another embodiment, the heater 240 may have no direct contact with reactor wall 250. In one such embodiment, the heater 240 may be positioned outside the reactor wall 250 and configured as a group of cylinders partially or completely covering one or more outlet surfaces of the reactor 200. In still another embodiment, the heater 240 may be configured to use radiation or a mix of direct heat conduction and heat radiation to heat the silicon beads 210 and the silicon-bearing gases to a temperature sufficient for the decomposition reaction.

In one embodiment, the fluidized bed reactor 200 may be heated during the production of high purity silicon to temperatures ranging from approximately 500° C. to approximately 1200° C. For example, the fluidized bed reactor 200 may be heated by the heaters 240 such that the silicon beads 210, the silicon-bearing gases, and the fluidizing gases 215 within the column 205 are heated to a temperature ranging from approximately 600° C. to 1100° C., or from 700° C. to 1000° C., or from 700° C. to 900° C., or from 750° C. to 850° C., or from 800° C. to 1000° C.

The fluidized bed reactor 200 may be configured to withstand the conditions during the decomposition reaction including temperatures ranging from approximately 500° C. to approximately 1200° C. and internal pressures ranging from approximately 50 mbar to approximately 6000 mbar. For example, the fluidized bed reactor 200 as described herein, may be constructed to withstand pressures of approximately up to 50 mbar, 100 mbar, 200 mbar, 500 mbar, 750 mbar, 1000 mbar, 1500 mbar, 2000 mbar, 2500 mbar, 3000 mbar, 3500 mbar, 4000 mbar, 4500 mbar, 5000 mbar, 5500 mbar and 6000 mbar. In another embodiment, the fluidized bed reactor 200 may be contained within another structure or enclosure configured to support pressures ranging from approximately 50 mbar to approximately 6000 mbar.

In one embodiment, one or more silicon-bearing gases, such as TCS, may be injected into the reactor 200. For example, the silicon-bearing gas may be injected into the reactor 200 through the inlet 220 into the column 205. In one such embodiment, a silicon-bearing gas, like TCS, decomposes to form silicon on the beads 210, increasing the diameter of the beads 210 over time until they may become a silicon product bead 212. In still another embodiment, the silicon-bearing gas may comprise a gas which decomposes when heated to form silicon and is a gas or a mixture of gases selected from the group of monosilane, disilane, trisilane, trichlorosilane, dichlorosilane, monochlorosilane, tribromosilane, dibromosilane, monobromosilane, triiodosilane, diiodosilane and monoiodosilane. In one embodiment, the high purity silicon product beads 212 may be recovered from the reactor 200 near the top of the column 205 at outlet 230 along with the effluent gas stream 235 that may include hydrogen, STC, HCl, unreacted TCS and monochlorosilane (MCS) and dichlorosilane (DCS).

In one embodiment, the concentration of the silicon-bearing gases in the feed stream to the fluidized bed reactor 200 may range from approximately 20 mol % to 100 mol %. In one embodiment, the average diameter of the fluidized silicon beads 210 may range from 0.5 mm to 4 mm. In another embodiment, the average diameter of the silicon beads 210 may range from 0.25 mm to 1.2 mm, or alternatively, 0.6 mm to 1.6 mm. In one embodiment, the silicon beads 210 may remain in the reactor 200 until a desired size is reached and the silicon product beads 212 are extracted from the reactor 200. In another embodiment, the time that the silicon beads 210 may remain in the reactor 200 may depend on the starting size of silicon beads 210. In one embodiment, the growth rate of the silicon beads 21 may depend, among other things, on the reaction conditions including gas concentrations, temperature and pressure. The minimum fluidization velocity and design operational velocity may be determined by one of ordinary skill in the art based on various factors. The minimum fluidization velocity may be influenced by factors including gravitational acceleration, fluid density, fluid viscosity, solid density, and solid particle size. The operational velocity may be influenced by factors including heat transfer and kinetic properties, such as height of the fluidized bed, total surface area, flow rate of silicon precursor in the feed gas stream, pressure, gas and solids temperature, concentrations of species, and thermodynamic equilibrium point.

In one embodiment, one or more surfaces of the fluidized bed reactor 200 may be made of a metal or a metal alloy. In one such embodiment, one or more surfaces of the reactor 200 may include a metal or metal alloy capable of withstanding the reaction temperatures. For example, the reactor wall 250 may be constructed of iron based-alloys, such as: stainless steel alloys, chromium-nickel alloys, and nickel based alloys including nickel-chromium alloys and nickel-chromium-molybdenum alloys, which may optionally include manganese, molybdenum, silicon, cobalt, tungsten, etc., which would be apparent to those having skill in the art with the aid of the present disclosure. In certain embodiments, the metal alloys may be chosen from: steel 1.4841, steel 1.4959, steel 2.4856, steel 2.4819 or steel 2.4617. For example, the reactor wall 250 may be configured to be thermoresistant to temperatures in the range of approximately 500° C. to 1,200° C. For example, the reactor wall 250 can be constructed to tolerate temperatures ranging from approximately 500° C. to 600° C., or from 500° C. to 700° C., or from 600° C. to 800° C., or from 800° C. to 900° C., or from 800° C. to 1000° C., or from 900° C. to 1100° C., or from 900° C. to 1200° C.

As shown by FIG. 2, the inside surface of the reactor wall 250 may be partially or completely coated with a protective layer 260 to avoid or minimize the contamination of the product beads 212 by diffusion of impurities from the reactor 200 or the reactor wall 250. In one such embodiment, the protective layer 260 may comprise materials that are inert or resistant to the conditions in the reactor 200, such as a metal or metal alloy capable of withstanding the reaction conditions within the reactor 200 and be compatible with the application of the protective layer 260. For example, the protective layer 260 may comprise materials that are resistant to heat, pressure, and corrosion by the fluidizing gases 215 or the silicon-bearing gases that are injected into the reactor 200.

In one embodiment, the fluidized bed reactor 200 may be lined with a protective layer 260 comprising a ceramic material that is resistant to corrosion or breakdown by the conditions in the reactor 200. In one such embodiment, the protective layer 260 may comprise at least one of the following materials: Alumina ($Al_2O_3$), Zirconium dioxide ($ZrO_2$) and Zirconium dioxide-yttrium stabilized. In another embodiment, the protective layer is a ceramic material made from a composition other than silicon-based or carbon-based. In yet another embodiment, the protective layer 260 may comprise at least one of Alumina ($Al_2O_3$), Zirconium dioxide ($ZrO_2$) and Zirconium dioxide-yttrium stabilized in combination with at least one of polycrystalline silicon, silicon carbide, silicon carbide coated graphite, silica, silicon nitride, tungsten carbide or molybdenum. In still another embodiment, the fluidized bed reactor 200 may include at least one of Alumina ($Al_2O_3$), Zirconium dioxide ($ZrO_2$) and Zirconium dioxide-yttrium stabilized in combination with one of: quartz, graphite, carbon fiber, or combinations thereof.

Figure 3:
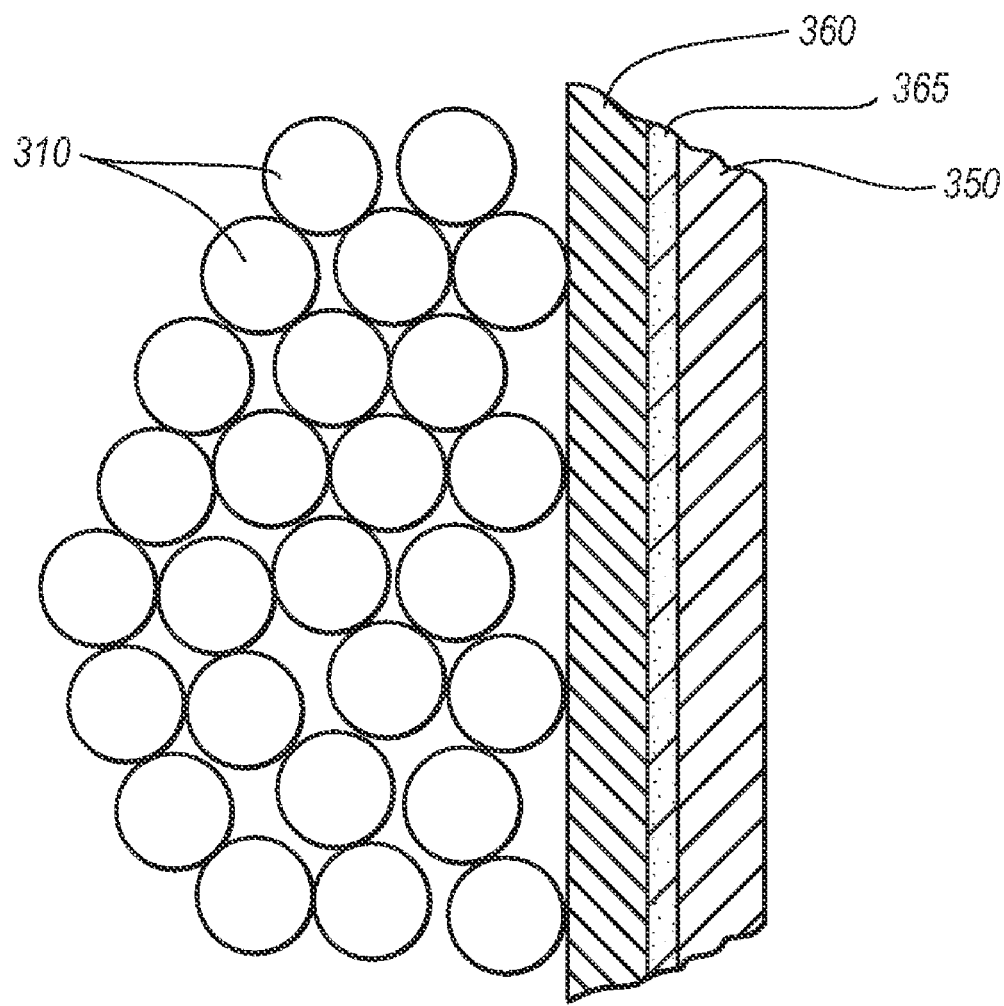
FIG. 3 shows a close-up cross section of one embodiment of a fluidized bed reactor as disclosed herein.

FIG. 3 is close-up view of a cross section of a wall of a fluidized bed reactor as described herein with silicon beads 310 disposed therein. In the embodiment shown by FIG. 3, the reactor wall 350 comprises a protective layer 360 and an adhesion layer 365 applied to the reactor wall 350 before the deposition of the protective layer 360. The adhesion layer 365 may provide a substrate to which the protective layer 360 may bind or attach improving the durability and function of the protective layer 360. In one such embodiment, an adhesion layer 365 may comprise a nickel based alloy with or without yttrium, particularly when iron based alloys, such as Cr—Ni alloys, comprise the reactor wall 250.

In one embodiment, the protective layer 260 may comprise a coating which has a depth of approximately 3 to 1000 microns. In one such example, the protective layer 260 has a depth ranging from approximately 5 to 900 microns, 10 to 700 microns, 20 to 500 microns, 25 to 400 microns or 40 to 300 microns. In another embodiment, the protective coating may have a depth of up to 5, 10, 15, 20, 25, 30, 35, 40, 45, 50, 55, 60, 65, 70, 75, 80, 95, 100, 150, 200, 250, 300, 350, 400, 450, 500, 600, 700, 800, or 900 microns.

The protective layer, such as protective layer 260 shown in FIG. 2, or protective layer 360 shown in FIG. 3, can be formed or deposited by one or more methods known by those of skill in the art including thermal projection, chemical vapor deposition, physical vapor deposition, solgel, electrophoretic deposition and aerosol thermal spraying.

In one embodiment, the deposition of the protective layer 260 or protective layer 360 may be followed by a thermal treatment. For example, the protective layer 260 may be annealed with a thermal treatment of temperatures ranging from approximately 900° C. to 1,300° C. In one such embodiment, the thermal treatment may comprise temperatures ranging from 900° C. to 1,000° C., or from 900° C. to 1,100° C., or from 1,000° C. to 1,200° C., or from 1,000° C. to 1,300° C.

EXAMPLES

The specific examples included herein are for illustrative purposes only and are not to be considered as limiting to this disclosure. The compositions referred to and used in the following examples are either commercially available or can be prepared according to standard literature procedures by those skilled in the art.

Example 1

Effects of Decomposition Conditions on Steel 1.4841

A. Nitrogen Gas

A sample of thermoresistant steel 1.4841 was subjected to decomposition conditions at 900° C. in the presence of silicon beads and a $N_2$ gas stream. After 100 hours under reaction conditions, the sample steel 1.4841 was removed from the reactor and cooled to room temperature.

Cross sections of the sample steel 1.4841 were then prepared for analysis with a scanning electron microscope (SEM). The SEM analysis revealed that the steel had been corroded as evidenced by a silicide layer extending into the metal to a depth of approximately 2 microns.

B. HCl and Hydrogen Gas

A sample of thermoresistant steel 1.4841 was subjected to decomposition conditions at 900° C. in the presence of silicon beads and HCl and $H_2$ (5:1). After 100 hours under reaction conditions, the sample steel 1.4841 was removed from the reactor and cooled to room temperature.

Cross sections of the sample steel 1.4841 were prepared as before for SEM analysis. The SEM analysis revealed a 50 micron silicide layer on the metal resulting from corrosion of the metal substrate by the chloride. The SEM analysis also revealed the formation of chlorides including iron and chromium chlorides.

C. Steel with $Cr_2O_3$ Layer

A sample of steel 1.4841 was coated with a 50 micron layer of $Cr_2O_3$ using chemical vapor deposition. The $Cr_2O_3$ coated steel was heated to 900° C. in the presence of silicon beads and $N_2$ gas. After 100 hours, the $Cr_2O_3$ coated steel was cooled to room temperature. SEM analysis showed the presence of silica and chromium on the surface of the steel, potentially due to the following reaction: $2Cr_2O_3 + 3Si \rightarrow 4Cr + 3SiO_2$.

D. Steel with Adhesion Layer and $ZrO_2$-yttrium Stabilized Protective Layer

A sample of steel 1.4841 was prepared with a nickel alloy adhesion layer to improve the adhesion of the ceramic layer. The nickel alloy adhesion layer (NiCrAlY) was deposited using an atmospheric plasma spray process. Next, the sample was covered with a 100 micron ceramic coating of $ZrO_2$-yttrium stabilized, and heated to 900° C., as before, in conditions simulating a fluidized bed reactor with silicon beads and in the presence of HCl and $H_2$ (5:1). After 100 hours, the $ZrO_2$-yttrium stabilized coated steel was cooled to room temperature. SEM analysis showed the steel 1.4841 with the ceramic coating of $ZrO_2$-yttrium stabilized resisted corrosion or degradation thereby minimizing or eliminating likely contamination of a silicon product. More particularly, SEM data showed that there was no migration of aluminum outside of the NiCrAlY adhesion layer. Likewise, there was no migration of chromium, manganese, and nickel outside of the steel 1.4841 and the NiCrAlY adhesion layer. Additionally, the SEM analysis showed that only a few particles of iron from the steel 1.4841 were present in the base of the NiCrAlY adhesion layer and, there was no iron migration into the $ZrO_2$-yttrium stabilized protective layer. Therefore, there was no contamination of the $ZrO_2$-yttrium stabilized protective layer that would threaten the purity of a silicon product.

E. Steel with Adhesion Layer and $Al_2O_3$ Protective Layer

As before, a sample of steel 1.4841 was prepared with a nickel alloy adhesion layer followed by the addition of an $Al_2O_3$ protective layer. The prepared sample was heated for 100 hours at 900° C. in a fluidized bed reactor with silicon beads fluidized with HCl and $H_2$ (5:1). After cooling to room temperature, SEM analysis showed that the $Al_2O_3$ protective layer prevented corrosion of the steel sample.

Example 2

Heat Transfer by a Radiant Heater

A. Untreated Stainless Steel

A stainless steel tube (AISI316L) approximately 0.5 meters long and with an outside diameter of 21.3 mm and a thickness of 2.77 mm was used to measure radiation heat transfer. A radiation heater with an inside diameter of 40 mm was positioned around the steel tube without contacting the surface of the steel tube. The steel tube and the radiation heater were insulated with 300 mm thick ceramic fiber. A stream of $N_2$ gas at mass flow rate of 15 Kg/h was passed along the inside of the steel tube horizontally. Thermowells were used to measure the temperature of the radiation heater, the external temperature of the steel tube at the inlet and outlet points of the $N_2$ gas stream, and the temperature of the $N_2$ gas stream at the inlet and outlet points. In steady state, the following temperatures were measured: $N_2$ inlet temperature=21° C.; $N_2$ outlet temperature=315° C.; outer wall tube temperature at the inlet=569° C., and at the outlet=773° C. The thermal power absorbed in the system was 1.325 W.

B. Sand-Blasted Stainless Steel

A stainless steel tube was prepared as previously described followed by sand-blasting the surface of the steel tube. After sand-blasting, the following temperatures from the stainless steel tube were measured: $N_2$ inlet temperature=20° C.; $N_2$ outlet temperature=445° C.; outer wall tube temperature at the inlet=953° C., and at the outlet=1,055° C. With the surface treatment, the thermal power absorbed in the system was 1.970 W.

The analysis showed that the thermal power transfer with the sand-blasting treatment was approximately 1.5 times greater that the untreated steel tube. The thermal power transfer to the $N_2$ gas stream is due to a combination of radiation from the heater to the outlet wall of the steel tube, conduction through the wall of the steel tube, and convection from the inner wall of the steel tube to the $N_2$ gas stream. The surface treatment resulted in a decreased reflectivity of the steel tube and an increased ability of the steel tube to absorb heat, thereby increasing the efficiency of heat transfer to the gas stream inside the steel tube. An estimation of the new emissivity value was calculated using the combination of the radiation, conduction and convection heat transfer. Values of the theoretical thermal power transfer were calculated in order to estimate the new value of the emissivity.

Not being bound by any particular theory, a calculation model using the following equations was used:

Dittus-Boelter Equation:

$$Nu_D = 0.023 \cdot Re_D^{0.8} \cdot Pr^n$$

$$h_{int} = \frac{Nu \cdot k}{D}$$

A grey body completely enclosed into another grey body equivalent convection coefficient due to radiation:

$$h_{ext} = \frac{\sigma}{\frac{1}{\varepsilon_1} + \frac{r_1}{r_2} \cdot \left(\frac{1-\varepsilon_2}{\varepsilon_2}\right)} \cdot \frac{T_1^4 - T_2^4}{T_1 - T_2}$$

Universal coefficient of heat transfer at the inlet and at the outlet of the pipe:

$$U = \frac{1}{\frac{r_{ext}}{r_{int} \cdot h_{int}} + \frac{r_{ext}}{k} \cdot \ln\left(\frac{r_{ext}}{r_{int}}\right) + \frac{1}{h_{ext}}}$$

The calculation model introduced the concept of mean logarithmic difference of universal coefficients of heat transfer, and temperatures, because U and $\Delta T$ vary along the heat exchanger.

The emissivity value of the heater was $\epsilon=0.7$ according to the manufacturer datasheet. The emissivity of stainless steel is 0.18 at 500° C.

The values of the first test were implemented in order to adjust the model, and in a second stage the values of the second test were implemented in order to obtain the new emissivity values through an iterative process. The sand-blasted stainless steel emissivity calculated was 0.52. Hence, the radiation heat transfer ratio was increased approximately 3 times by the sand-blasting surface treatment.

It will be obvious to those having skill in the art that many changes may be made to the details of the above-described embodiments without departing from the underlying principles of the invention. The scope of the present invention should, therefore, be determined only by the following claims.

The invention claimed is:

1. A fluidized bed reactor for the production of high purity silicon, the fluidized bed reactor comprising:
  a chamber having dimensions to contain silicon particles capable of being fluidized therein, the chamber having a wall constructed of a metal alloy;
  a gas inlet in the chamber configured to receive a gas to fluidize the particles inside the chamber, wherein the gas inlet is coupled to a source of silicon-bearing gas;
  a silicon particle inlet configured for the addition of silicon particles into the chamber;
  an outlet in the chamber configured to allow the recovery of the high-purity silicon;
  an outlet configured to allow an effluent gas stream to leave the chamber; and a ceramic protective layer deposited on at least a portion of an inside surface of the chamber wherein the ceramic protective layer comprises zirconium dioxide-yttrium stabilized; and wherein the ceramic protective layer is configured to be resistant to corrosion by the fluidizing gas.

2. The fluidized bed reactor of claim 1, wherein the metal alloy is an iron-based alloy selected from at least one of the following: a stainless steel alloy and a chromium-nickel alloy.

3. The fluidized bed reactor of claim 2, wherein the metal alloy further includes at least one of the following: manganese, molybdenum, silicon, cobalt and tungsten.

4. The fluidized bed reactor of claim 1, wherein the metal alloy is a nickel-based alloy selected from at least one of the following: a nickel-molybdenum alloy and a nickel-chromium-molybdenum alloy.

5. The fluidized bed reactor of claim 4, wherein the metal alloy further includes at least one of the following: manganese, molybdenum, silicon, cobalt and tungsten.

6. The fluidized bed reactor of claim 1, further comprising an adhesion layer positioned between the protective layer and the inside surface of the chamber.

7. The fluidized bed reactor of claim 6, wherein the adhesion layer comprises at least one of the following: a nickel alloy layer and a nickel-chromium-yttrium layer.

8. The fluidized bed reactor of claim 1, wherein the ceramic protective layer deposited on the inside surface of the chamber is deposited by at least one of the following: thermal projection, chemical vapor deposition, physical vapor deposition, solgel, electrophoretic deposition and aerosol thermal spraying.

9. The fluidized bed reactor of claim 1, wherein the chamber comprises an external surface and, wherein at least a portion of the external surface of the chamber has been treated to improve the thermal power transfer efficiency of the chamber compared to an untreated external surface.

10. The fluidized bed reactor of claim 9, wherein the external surface of the chamber is sand-blasted to improve the thermal power transfer efficiency of the chamber.

11. The fluidized bed reactor of claim 1, wherein the chamber is constructed of a material configured to withstand internal pressures ranging from approximately 50 mbar to approximately 5000 mbar.

12. The fluidized bed reactor of claim 1, wherein the chamber is constructed of a material configured to withstand temperatures ranging from approximately 500° C. to approximately 1200° C.

13. The fluidized bed reactor of claim 1, wherein the silicon particles comprise silicon beads and the gas comprises at least one of the following: hydrogen, helium, argon, silicon tetrachloride, silicon tetrabromide, silicon tetraiodide, monosilane, disilane, trisilane, trichlorosilane, dichlorosilane, monochlorosilane, tribromosilane, dibromosilane, monobromosilane, triiodosilane, diiodosilane and monoiodosilane.

14. The fluidized bed reactor of claim 1, further comprising at least one reactor heater, wherein the at least one reactor heater comprises at least one of the following: a radiation heater and a conduction heater.

15. A fluidized bed reactor used in the production of high-purity silicon, comprising:
a chamber having dimensions to receive silicon beads capable of being fluidized therein, the chamber having a wall constructed of a metal alloy;
a gas inlet in the chamber configured to receive a fluidizing gas and a silicon-bearing gas to fluidize the particles inside the chamber, wherein the gas inlet is coupled to a source of the fluidizing gas and the silicon-bearing gas;
an outlet in the chamber configured to allow a recovery of the high-purity silicon;
an outlet configured to allow an effluent gas stream to leave the chamber; and
a protective layer deposited on at least a portion of an inside surface of the chamber wherein the protective layer comprises zirconium dioxide-yttrium stabilized.

16. A fluidized bed reactor used in the production of high-purity silicon, comprising:
a chamber having dimensions to contain silicon beads capable of being fluidized therein, the chamber having a wall constructed of a metal alloy;
a gas inlet in the chamber configured to receive a fluidizing gas and a silicon-bearing gas to fluidize the silicon beads inside the chamber, wherein the gas inlet is coupled to a source of the fluidizing gas and the silicon-bearing gas;
an outlet in the chamber configured to allow the recovery of the high-purity silicon;
an outlet configured to allow an effluent gas stream to leave the chamber; and
a protective layer deposited on at least a portion of an inside surface of the chamber, the protective layer having a composition being other than silicon-based or carbon-based, wherein the protective layer comprises zirconium dioxide-yttrium stabilized.

* * * * *